United States Patent [19]
Jahn et al.

[11] Patent Number: 6,138,110
[45] Date of Patent: Oct. 24, 2000

[54] METHOD AND SYSTEM FOR PROVISIONING TELECOMMUNICATIONS SERVICES IN AN ADVANCED INTELLIGENT NETWORK

[75] Inventors: Alfredo Jahn; Heather M. Doone, both of Dallas, Tex.

[73] Assignee: Alcatel USA Sourcing, L.P., Plano, Tex.

[21] Appl. No.: 09/001,331

[22] Filed: Dec. 30, 1997

[51] Int. Cl.[7] ............................................. G06F 17/30
[52] U.S. Cl. ................................................ 707/1
[58] Field of Search ........................... 707/1, 2, 10, 100, 707/102, 104

[56] References Cited

U.S. PATENT DOCUMENTS 5,452,450  9/1995  Delory ........................................ 707/10

FOREIGN PATENT DOCUMENTS 9749217  12/1997  WIPO ............................ H04L 29/06

OTHER PUBLICATIONS

N. Kasaura, et al., "Distribution of Service Data to Distributed SCPS in the Advanced In", Globecom '95, IEEE, vol. 2, Nov. 14, 1995, pp. 1272–1276.

F. Ljungblom, "A Service Management System for the Intelligent Network", Ericsson Review, vol. 67, No. 1, Jan. 1, 1990, pp. 32–41.

J. Kim, et al., "Design and Implementation of Service Database Management in the Combined SCP/SMS", Intelligent Networks Conference, Tampa, May 4–6, 1992, pp. 592–599.

T. Shimogaki, et al., "Development of Intelligent Network System", NEC Research and Development, vol. 34, No. 1, Jan. 1, 1993, pp. 109–121.

R. Robrock, II, "The Intelligent Network–Changing the Face of Telecommunications", Proceedings of the IEEE, vol. 79, No. 1, Jan. 1, 1991, pp. 7–20.

M. Shnier, "Dictionary of PC Hardware and Data Communications Terms", 1996, O'Reilly, Retrieved from Internet: <URL: http://www.oreilly.com/reference/dictionary/,5 pages.

*Primary Examiner*—Hosain T. Alam
*Assistant Examiner*—Sanjiv Shah
*Attorney, Agent, or Firm*—Baker Botts L.L.P.

[57] ABSTRACT

A method of provisioning services in a telecommunications network includes providing a client site having a client interface. Database sites connected to the client site in the telecommunications network are determined. The database sites each have a server interface and at least one database storing data for a telecommunications service. A communication session between the client interface and the server interfaces of the database sites is established. At the client interface, a database operation is received to be performed in at least one database of the database sites. The database operation is transmitted from the client interface to at least one server interface for execution in a database.

13 Claims, 4 Drawing Sheets

METHOD AND SYSTEM FOR PROVISIONING TELECOMMUNICATIONS SERVICES IN AN ADVANCED INTELLIGENT NETWORK

TECHNICAL FIELD OF THE INVENTION

This invention relates generally to the field of telecommunications, and more particularly to a method and system for provisioning telecommunications services in an advanced intelligent network (AIN).

BACKGROUND OF THE INVENTION

Consumers of telecommunications services are constantly demanding new and more advanced services to facilitate their personal communications. Examples of such services are free phone (FPH) services such as time dependent routing, calling card (CCD) services, virtual private network (VPN) services and personal 1-800 services. Information associated with these services such as telephone and calling card numbers is typically stored in one or more databases.

Advanced telecommunications systems often include a service control point (SCP) that contains the databases. The service control point accesses the databases to provide routing and other information for the advanced services demanded by telephone users. For example, a service switching point (SSP) may transmit a dialed 1-800 number to the service control point to receive the actual routing number associated with the dialed 1-800 number. The actual routing number may vary depending on, for example, the time the dialed 1-800 number call was placed or the originating location of the dialed 1-800 number. A database in the service control point is accessed with the dialed 1-800 number, and information associated with the 1-800 number and an appropriate routing number is selected from the database for transmission back to the service switching point.

A customer of a telecommunications system such as, for example, MCI, Sprint, AT&T, or GTE, typically provision the databases at the service control point. Examples of provisioning the databases include adding subscriber names and information to the databases, deleting subscriber names and information from the databases and updating current entries to reflect changes in data associated with a subscriber.

Conventional methods for provisioning databases suffer several disadvantages. For example, databases in each service control point are provisioned by a local interface residing in the service control point. As a result, provisioning operations must be separately initiated on each service control point.

SUMMARY OF THE INVENTION

In accordance with the present invention, a method and system for provisioning telecommunications services is provided that substantially reduces or eliminates disadvantages and problems associated with prior systems and methods. In particular, the method and system remotely provisions service databases residing in one or more sites to improve the efficiency associated with providing telephony services in an advanced intelligent network.

In one embodiment, the method of provisioning services in a telecommunications network includes providing a client site having a client interface. Database sites connected to the client site in the telecommunications network are determined. The database sites each have a server interface and at least one database storing data for a telecommunications service. A communication session between the client interface and the server interfaces of the database sites is established. At the client interface a database operation is received to be performed in at least one database of the database sites. The database operation is transmitted from the client interface to at least one server interface for execution in a database.

Technical advantages of the present invention include providing an improved method and system for provisioning services in a telecommunications network. In particular, a database operation received at a client site may be transmitted to a plurality of remote database sites for execution. For an advanced intelligent network, the client site may be a service management system and the database sites may be service control points. Thus, the service control points are provisioned together from a central site, which reduces or eliminates redundant processing at each network site. In addition, the client interface is modular and may be deployed on any network element. Thus, the client interface may be deployed in both the service management system and the service control points of the advanced intelligent network.

Another technical advantage of the present invention includes providing an open architecture for provisioning services in a telecommunications network. In particular, the client and server interfaces communicate via a dedicated socket using a standard TCP/IP protocol. This provides an open interface that allows subscribers to remotely access the server interface to provision personal service data, such as, for example, call forwarding information.

Other technical advantages will be readily apparent to one skilled in the art from the following figures, description, and claims.

BRIEF DESCRIPTION OF THE DRAWINGS

For a more complete understanding of the present invention, and its advantages thereof, reference is now made to the following description taken in conjunction with the accompanying drawings in which.

DETAILED DESCRIPTION OF THE INVENTION

Figure 1:
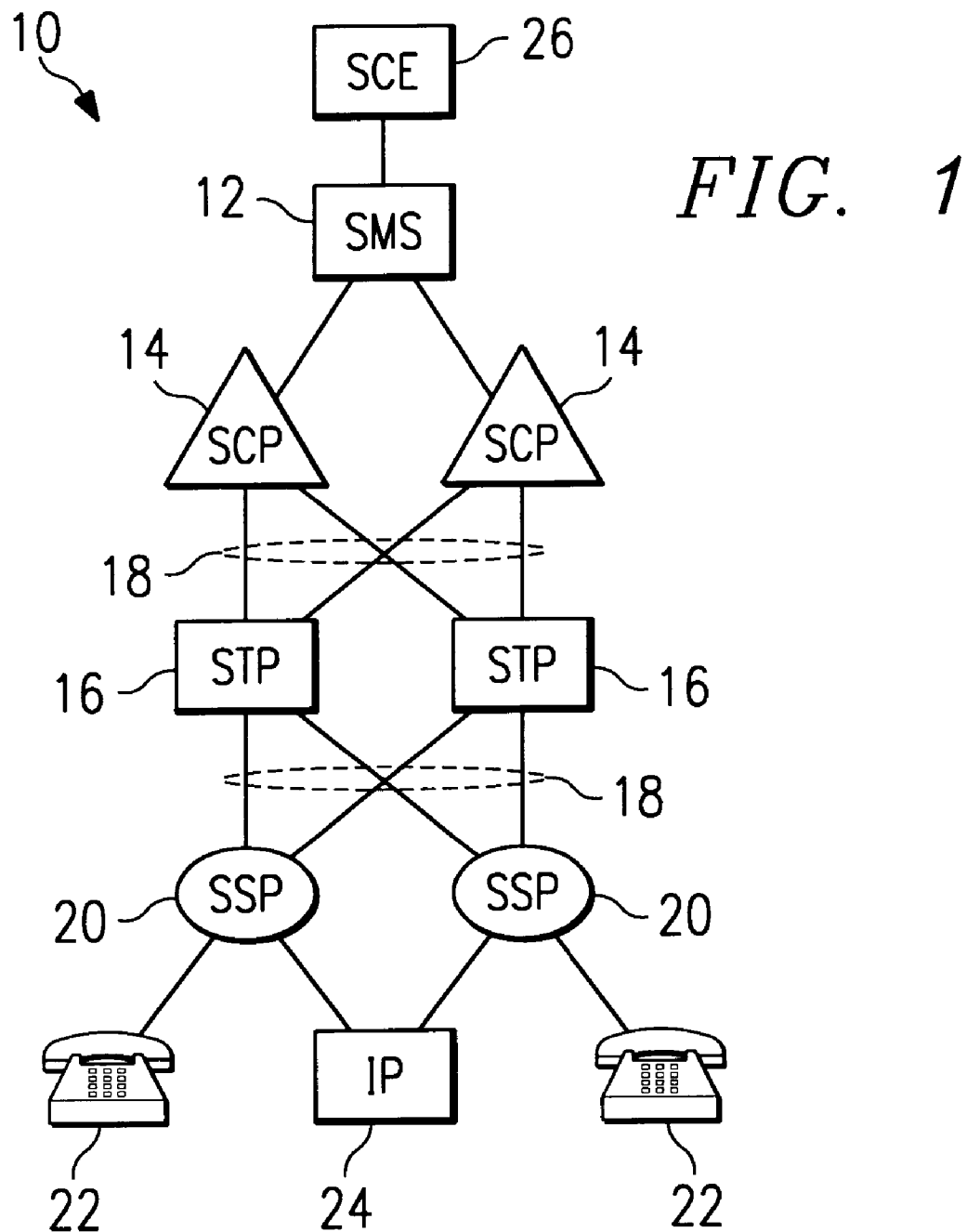
FIG. 1 is a block diagram illustrating an exemplary telecommunications network such as an advanced intelligent network (AIN) for use in connection with the present invention.

FIG. 1 is a block diagram illustrating an advanced intelligent network (AIN) 10 for use in connection with the present invention. The advanced intelligent network 10 includes a service management system (SMS) 12 that interfaces with a plurality of service control points (SCP) 14 and a plurality of signal transfer points (STP) 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7 (SS7) link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete routing of a call. The service switching points 20 are part of a publicly switched telephone network (PSTN) and are coupled to the telephone service subscribers, which include wire-based telephones, wireless telephones 22 and intelligent peripherals 24.

A service creation environment 26 allows the creation and testing of service logic programs outside of the network 10. Completed service logic programs are downloaded to the service control points 14 and the signal transfer points 16 through the service management system 12 for execution on the network 10.

Figure 2:
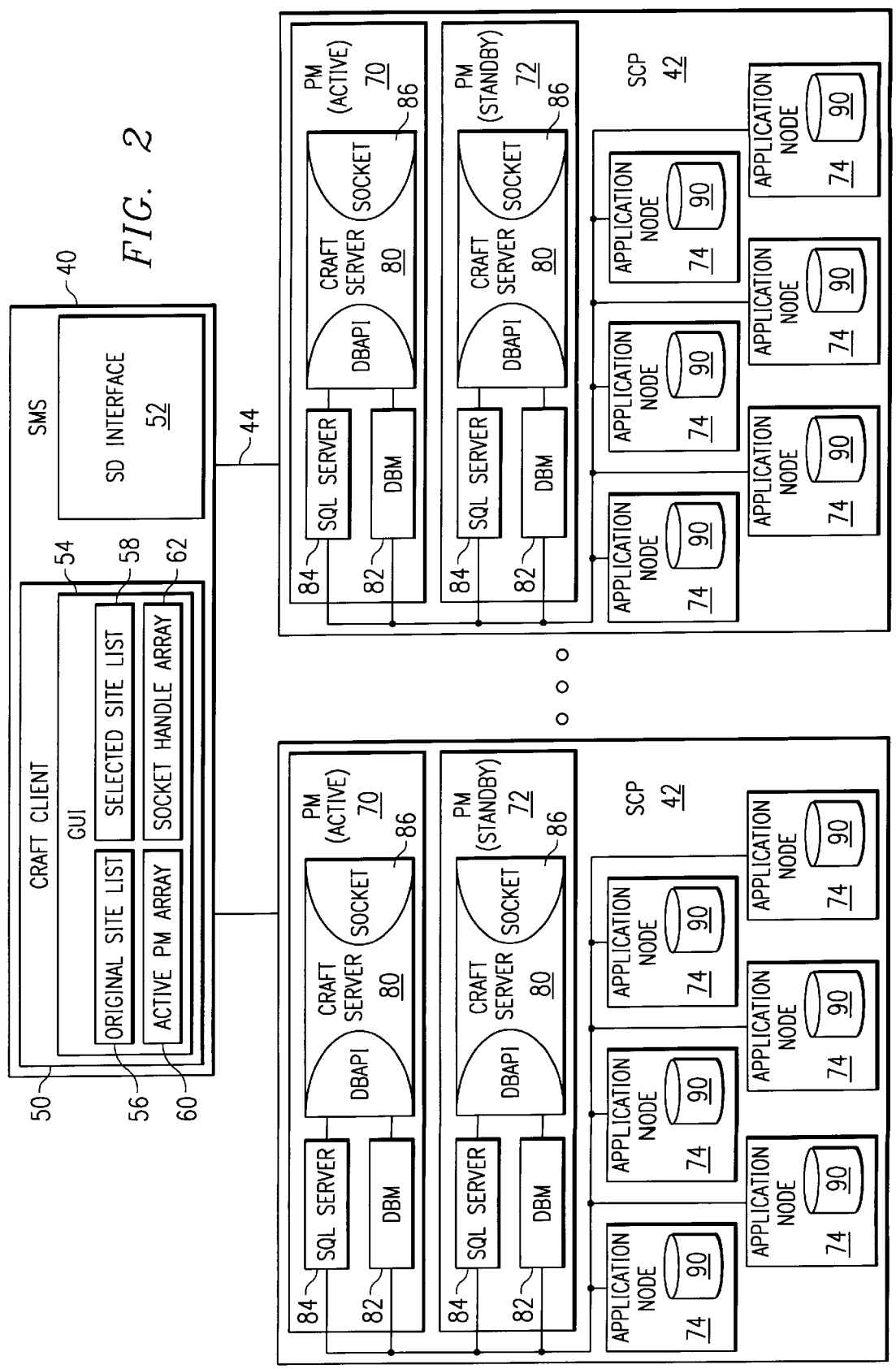
FIG. 2 is a block diagram illustrating details of a service management system (SMS) and a plurality of service control points (SCP) in accordance with the present invention.

FIG. 2 is a block diagram illustrating details of a service management system 40 connected to a plurality of remote service control points 42 via a network 44 in accordance with the present invention. The service management system 40 may be a UNIX workstation or any other type of computer capable of storing and processing data. The service management system 40 includes computer software that is loaded into memory and executed by a processor. The computer software is generally identified by distinct modules, systems and files. It will be understood that the computer software may be otherwise combined or divided for processing without departing from the scope of the present invention. Accordingly, labels of the modules are for illustrative purposes and may be suitably varied.

The service management system 40 includes a craft client 50 and an SD interface 52. As described in more detail below, the craft client 50 is operable to receive database operations and to transmit the operations to the remote service control points 42. As a result, the service control points 42 are together provisioned from a central site, which reduces or eliminates redundant processing at each network site.

The craft client 50 includes a graphical user interface 54 programmed with TCL/TK programming language. The graphical user interface 54 contains an original site list 56, a selected site list 58, an active platform manager array 60 and a socket handle array 62. The original site list 56 stores a list of service control points 42 connected to the service management system 40 via the network 44. The selected site list 58 is based on the original site list 56 and adds a status, such as, for example, selected or deselected, for each of the service control points 42. The selected site list 58 allows operators to deselect sites that are experiencing operational difficulties and to reselect deselected sites after such difficulties have been corrected.

The active platform manager array 60 stores the active platform managers of the service control points 42 indexed by the service control points 42. The active platform manager array 60 associates each active platform manager with its service control point 42. The craft client 50 accesses the active platform manager array 60 to determine the active platform managers of the service control points 42. The socket handle array 62 stores socket handles for the active platform managers indexed by the active platform managers.

The socket handle array 62 is accessed by the craft client 50 to determine the socket handle for communicating with an active platform manager of a service control point 42. It will be understood that the craft client 50 may include other arrays that store handles and other information for accessing the active platform managers and other elements of the service control points 42. For example, in one embodiment, the craft client 50 includes a database array that stores handles to the databases of the service control points 42 indexed by site. These handles are provided by a craft server of a service control point 42 upon a initial database open command and are used to modify the database.

The SD interface 52 uses CORBA to communicate site information. The SD interface 52 is a TCL/TK class, which is instatiated by the graphical user interface 54. As described in more detail below, the SD interface 52 is used by the craft client 50 to determine the service control points 42 connected to the service management system 40 via the network 44. The craft client 50 also uses the SD interface 52 to determine the active platform managers of the service control points 42. The craft client 50 generates the original site list 56 and the active platform manager array 60 based on this information provided by the SD interface 52.

The service control points 42 are each redundant and include an active platform manager (PM) 70, a standby platform manager 72 and a plurality of application nodes 74. The platform managers may each be a UNIX workstation or any other type of computer capable of storing and processing data. The service control point 42 includes computer software that is loaded into memory and executed by a processor. The computer software is generally identified by distinct modules, systems and files. It will be understood that the computer software may be otherwise combined or divided for processing without departing from the scope of the present invention. Accordingly, labels of the modules are for illustrative purposes and may be suitably varied.

The active and standby platform managers 70 and 72 are generally redundant and provide back-up for each other. Thus, the standby platform manager 72 will become active upon failure of the active platform manager 70.

The platform managers 70 and 72 each include a craft server 80, a database manager (DBM) 82 and an SQL server 84. As described in more detail below, the craft server 80 is operable to receive database operations remotely from the craft client 50 and to pass the database operations to the database manager 82 or SQL server 84 for execution. As a result, the service control points 42 are together provisioned from a central site, which reduces or eliminates redundant processing at each network site.

The craft server 80 is programmed in C++ with a TCL/TK interface. The craft server 80 includes a dedicated socket 86 for establishing a communication session with the craft client 50 and a database manager application program interface (DBAPI) 88 for accessing the database manager 82. The dedicated socket 86 is a standard UNIX socket that passes a handle to establish a communication session. As previously described, the handle for the socket 86 of the craft server 80 is stored in the socket handle array 62 of the craft client 50.

In a particular embodiment, the designated socket 86 may be socket number 5150. In this and other embodiments, the craft client 50 and craft server 80 communicate using standard TCP/IP protocol. Accordingly, the craft server 80 is an open architecture that allows remote accessed by any system such as, for example, a Web Browser, that uses the standard TCP/IP protocol and connects via a socket. As a result, subscribers may remotely access the craft server 80 to provision personal service data, such as, for example, call forwarding information.

The craft server 80 passes database operations to either the database manager 82 or the SQL server 84 depending on the type of database operation. The database manager 82 can handle all types of database operations but is generally used to execute database modification operations such as inserts, deletes and updates. The database manager 82 is operable to perform database modification operations on redundant sets of application nodes 74. The redundant application nodes 74 each store the same data for a service and share the service load. The SQL server 84 is used to execute queries and other database operations that do not modify the databases. SQL is a standard database interface (e.g. Sybase) language.

The application nodes 74 each include a UNIX workstation (not shown) and a database 90. The databases 90 are SyBase. The databases 90 store data, such as, for example, telephone numbers that support free phone (FPH), virtual private network (VPN) personal 1-800 and other telecommunications services. It will be understood that the service management system 40 and service control points 42 may be otherwise configured and include other elements without departing from the scope of the present invention.

In the embodiment of FIG. 2, the service management system 40 is a client site and the service control points 42 are database sites in the network 44. The database sites are network elements that have a server interface and at least one database storing data for a telecommunications service. The server interface is the craft server 80 and the client interface is the craft client 50. Thus, the client and server interfaces are remote. It will be understood that the client and server interfaces may be otherwise deployed in the network. For example, the client interface may be deployed on a service control point 42 to allow provisioning from the service control point 42. Thus, the client interface is modular and may be deployed on any suitable network site.

Figure 3A:
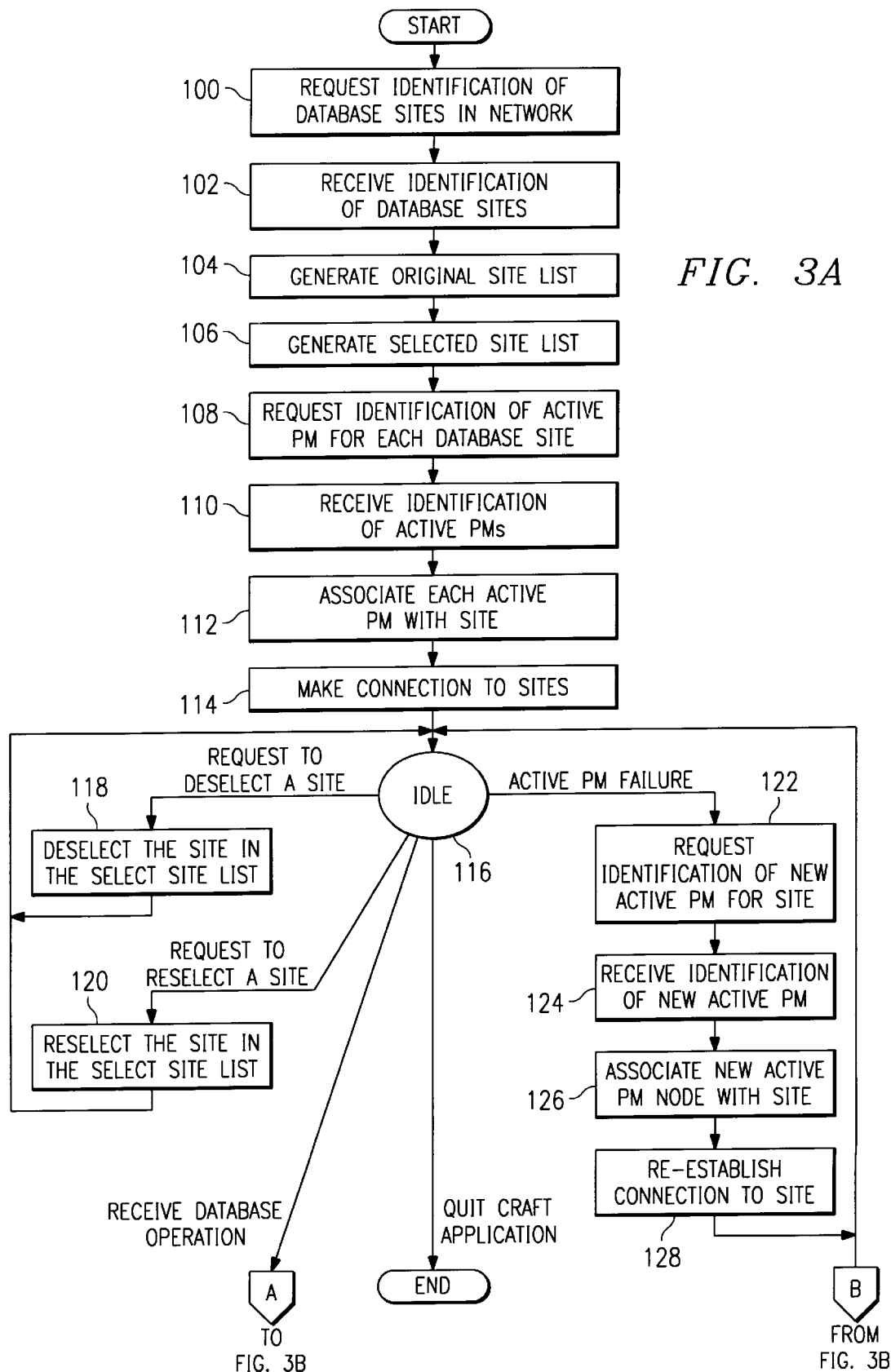
FIGS. 3A–B is a flow diagram illustrating a computer method of provisioning service databases in accordance with the present invention.
Figure 3B:
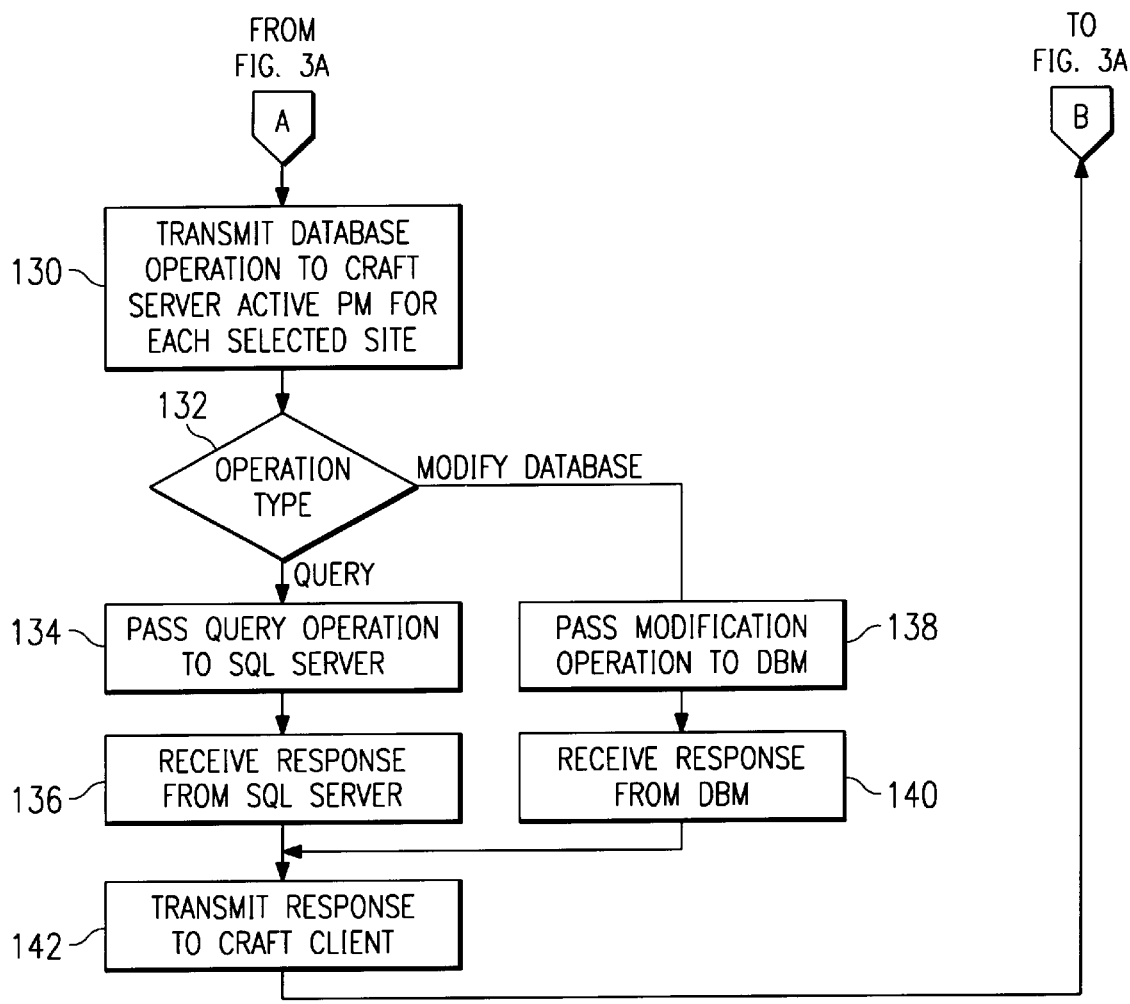

FIGS. 3A–B is a flow diagram illustrating a computer method of provisioning service databases in accordance with the present invention. Referring to FIG. 3A, the method begins at step 100 in which the craft client 50 requests identification of database sites in the network 44. The request is passed to the SD interface 52 which broadcasts the request from the service management system 40 over the network 44 for each service control point 42 to respond with an identification of the service control point 42. The SD interface 52 receives the identification of the service control points 42 connected to the service management system 40. At step 102, the craft client 50 receives identifications of the database sites from the SD interface 52.

Proceeding to step 104, the craft client 50 generates the original site list 56. The original site list 56 includes each service control point 42 for which an identification was received. Next, at step 106, the craft client 50 generates the selected site list 58. Initially, each of the service control points 42 is selected. It will be understood that other suitable defaults may be used for the status of the service control points 42 in the selected site list 58.

Next, at step 108, the craft client 50 requests identification of active platform managers 70 for each of the service control points 42. The request is passed to the SD interface 52 which transmits a request from the service management system 40 over the network 44 to each service control point 42 to respond with an identification of the active platform manager 70. The SD interface 52 receives the identifications of the active platform manager from each service control point 42. At step 102, the craft client 50 receives identifications of the active platform managers 70 from the SD interface 52.

Proceeding to step 112, the craft client 50 generates the active platform manager array 60 to associate each active platform manager with its service control point 42. At step 114, the craft client 50 establishes connections with the craft servers 80 of the active platform managers 70 of the service control points 42. The connections are established via the sockets 86 which each pass a handle for further communications. The handles are stored in the socket handle array 62. Step 114 leads to IDLE state 116.

In response to a deselection request, state 116 leads to step 118. At step 118, the craft client 50 deselects the service control point 42 in the selected site list 58. As a result, database operations will not be transmitted to that service control point 42. Step 118 returns to state 116.

In response to a reselection request, state 116 leads to step 120. At step 120, the craft client 50 reselects the service control point 42 in the selected site list 58. As a result, database operations will now be transmitted to that service control point 42. Step 120 returns to state 116.

In response to failure of an active platform manager 70, state 116 leads to step 122. At step 122, the craft client 50 requests identification of a new active platform manager for the service control point 42 on which the active platform manager 70 failed. The request is passed to SD interface 52 which transmits the request to the service control point 42 to respond with an identification of the new active platform manager. The SD interface 52 receives the identification of the new active platform manager from each service control point 42. The new active platform manager is the standby platform manager 72. At step 124, the craft client 50 receives the identification of the new active platform manager from the SD interface 52. At step 126, the craft client 50 associates the new active platform manager with the service control point 42 in the active platform manager array 60. Next, at step 128, the craft client 50 reestablishes connection with the service control point 42 via the socket 86. As previously described, the socket passes a handle which is stored in the socket handle array 62 for further communication between the craft client 50 and the craft server 80 of the new active platform manager. Step 128 returns to state 116.

Referring to FIG. 3B, in response to receiving a database operation, state 116 leads to step 130. At step 130, the craft client 50 transmits the database operation to the craft server 80 of the active platform manager 70 for the service control points 42 selected in the selected site list 58. This is accomplished by using the selected site list 58 to determine the selected service control points 42, using the selected service control points 42 in connection with the active platform manager array 60 to determine the active platform managers 70 for the selected service control points 42 and using those active platform managers 70 in connection with the socket handle array 62 to determine the socket handles for the craft servers 80 of the selected service control points 42. Using the socket handles, the database operation is transmitted from the craft client 50 to the craft server 80 in a standard TCP/IP protocol.

Proceeding to decisional step 132, if the operation is a query or other operation not modifying the database, the query branch of decisional step 132 leads to step 134. At step 134, the client server 80 passes the query operation to the SQL server 84. The SQL server 84 accesses the relevant application node 74 to carry out the operation. At step 136, the client server 80 receives a response from the SQL server 84 returns a response to the client server 80.

Returning to decisional step 132, if the operation will modify the database 90, such as, for example, insert, delete, update, the modify database branch of decisional step 132 leads to step 138. At step 138, the craft server 80 passes the modification operation to the database manager 82. The database manager 82 accesses the relevant application nodes 74 to carry out the operation. Next, at step 140, the database manager 82 returns a response to the client server 80.

Steps 136 and 140 lead to step 142 in which the craft server 80 transmits the response to the craft client 50. Step 142 returns to state 116. Referring to FIG. 3A, after all service provisioning has been accomplished, the operator may quit the craft application and end the process. Although the method has been described in connection with service management system 40 and remote service control points 42, it will be understood that the method may be used for a craft interface on a platform with the server interface. In this embodiment, the number of database sites is one, which is the site shared by the craft and server interfaces.

Although the present invention has been described with several embodiments, various changes and modifications may be suggested to one skilled in the art. It is intended that the present invention encompass such changes and modifications as fall within the scope of the appended claims.

What is claimed is:

1. A method of provisioning services in a telecommunications network, comprising:

providing a client site in a telecommunications network, the client site having a client interface;

determining database sites connected to the client site in the telecommunications network, the database sites each having a server interface and at least one database storing data for a telecommunications service;

establishing a communication session between the client interface and the server interfaces of the database sites;

receiving at the client interface a database operation to be performed in at least one database of the database sites;

transmitting the database operation from the client interface to at least one server interface for execution in a database;

initially selecting each of the database sites connected to the client site for transmission of the database operations;

in response to an operator request, deselecting a database site; and transmitting the database operation from the client interface to the server interface of each selected database site.

2. The method of claim 1, further comprising:

reselecting the database site in response to a second operator request.

3. A method of provisioning services in a telecommunications network, comprising:

providing a client site in a telecommunications network, the client site having a client interface;

determining database sites connected to the client site in the telecommunications network, the database sites each having a server interface and at least one database storing data for a telecommunications service;

establishing a communication session between the client interface and the server interfaces of the database sites;

receiving at the client interface a database operation to be performed in at least one database of the database sites;

transmitting the database operation from the client interface to at least one server interface for execution in a database;

initially selecting each of the database sites connected to the client site for transmission of the database operations;

in response to a failure of a database site, deselecting the database site; and transmitting the database operation from the client interface to the server interface of each selected database site.

4. A method of provisioning services in a telecommunications network, comprising:

providing a client site in a telecommunications network, the client site having a client interface;

determining database sites connected to the client site in the telecommunications network, the database sites each having a server interface and at least one database storing data for a telecommunications service;

establishing a communication session between the client interface and the server interfaces of the database sites;

receiving at the client interface a database operation to be performed in at least one database of the database sites;

transmitting the database operation from the client interface to at least one server interface for execution in a database;

generating a first list including each of the database sites connected to the client site;

generating a second list including a status for each database site of the first list;

transmitting the database operation from the client interface to the server interfaces of only the database sites having a first value of the status.

5. The method of claim 4, wherein the second list is operable to be accessed by an operator to change the status of a database site.

6. A method of provisioning services in a telecommunications network, comprising:

providing a client site in a telecommunications network, the client site having a client interface;

determining database sites connected to the client site in the telecommunications network, the database sites each having a server interface and at least one database storing data for a telecommunications service;

establishing a communication session between the client interface and the server interfaces of the database sites;

receiving at the client interface a database operation to be performed in at least one database of the database sites;

transmitting the database operation from the client interface to at least one server interface for execution in a database;

if the database operation modifies data for a telecommunications service, the server interface passing the database operation to a database manager operable to modify databases storing data for the telecommunications service; and if the database operation is a query, the server interface passing the database operation to an SQL server operable to query the database independently of the database manager.

7. A method of provisioning services in a telecommunications network, comprising:

providing a client site in a telecommunications network, the client site having a client interface;

determining database sites connected to the client site in the telecommunications network, the database sites each having at least one database storing data for a telecommunications service and an active and a standby site manager with a server interface;

for each database site, determining the active site manager;

establishing a communication session between the client interface and the server interfaces of the active site managers of the database sites;

receiving at the client interface a database operation to be performed in at least one database of the database sites;

transmitting the database operation from the client interface to at least one server interface of an active site manager for execution in a database;

generating a first list including each of the database sites connected to the client site;

generating a second list including a status for each database site of the first list;

associating each active site manager with its database site; and transmitting the database operation from the client interface to the server interfaces of only the database sites having a first value of the status.

8. A method of provisioning services in a telecommunications network, comprising:

providing a client site in a telecommunications network, the client site having a client interface;

determining database sites connected to the client site in the telecommunications network, the database sites each having at least one database storing data for a telecommunications service and an active and a standby site manager with a server interface;

for each database site, determining the active site manager;

establishing a communication session between the client interface and the server interfaces of the active site managers of the database sites;

receiving at the client interface a database operation to be performed in at least one database of the database sites;

transmitting the database operation from the client interface to at least one server interface of an active site manager for execution in a database, wherein the communication session with a server interface is established via a dedicated socket at the server interface;

generating a second list including a status for each database site of the first list;

associating each active site manager with its database site;

generating an array of active site managers indexed by database site;

generating an array of socket handles indexed by active site manager;

using the second list to determine database sites having a first value of the status;

using the array of active site managers to determine active site managers for the database sites having the first value of the status;

using the array of socket handles to determine socket handles for the active site managers of the database sites having the first value of the status; and transmitting the database operation from the client interface to the server interfaces using only the socket handles for the active site managers of the database sites having the first value of the status.

9. A method of provisioning services in a telecommunications network, comprising:

providing a client site in a telecommunications network, the client site having a client interface;

determining database sites connected to the client site in the telecommunications network, the database sites each having at least one database storing data for a telecommunications service and an active and a standby site manager with a server interface;

for each database site, determining the active site manager;

establishing a communication session between the client interface and the server interfaces of the active site managers of the database sites;

receiving at the client interface a database operation to be performed in at least one database of the database sites;

transmitting the database operation from the client interface to at least one server interface of an active site manager for execution in a database;

wherein the step of determining database sites connected to the client site in the telecommunications network includes:

broadcasting a request from the client site over the telecommunications network for each database site to respond with an identification of the database site; and receiving the identification of the database sites connected to the client site in the telecommunications network.

10. The method of claim 9, wherein the request is broadcast and the identifications are received via a Corba interface in the client site.

11. The method of claim 9, wherein the step of determining an active site manager for each database site connected to the client site in the telecommunications network includes:

transmitting a second request from the client site over the telecommunications network to each database site to respond with an identification of the active site manager; and receiving the identification of the active site managers from the database sites.

12. A method of provisioning services in a telecommunications network, comprising:

providing a client site in a telecommunications network, the client site having a client interface;

determining database sites connected to the client site in the telecommunications network, the database sites each having at least one database storing data for a telecommunications service and an active and a standby site manager with a server interface;

for each database site, determining the active site manager;

establishing a communication session between the client interface and the server interfaces of the active site managers of the database sites;

receiving at the client interface a database operation to be performed in at least one database of the database sites;

transmitting the database operation from the client interface to at least one server interface of an active site manager for execution in a database;

in response to a failure of the active site manager in one of the database sites, the standby site manager becoming a new active site manager in the database site;

determining the new active site manager;

establishing a communication session between the client interface and the server interface of the new active site manager of the database site.

13. An advanced intelligent network, comprising:

a service management system having a client interface;

a plurality of service control points connected to the service management system via a network, the service control points each having a server interface and at least one database storing data for a telecommunications service;

the client interface operable to identify the service control points and to establish a communication session between the client interface and the server interfaces of the service control points; and in response to receiving a database operation to be performed in at least one database of the service control points, the client interface operable to transmit the database operation from the client interface to at least one server interface for execution in a database;

a list including a status for each service control point, the client interface operable to transmit the database operation from the client interface to the server interfaces of only the service control points having a first value of the status in the list.

* * * * *